United States Patent
Blessing et al.

(10) Patent No.: US 7,059,295 B2
(45) Date of Patent: Jun. 13, 2006

(54) SELF-IGNITING INTERNAL COMBUSTION ENGINE

(75) Inventors: Matthias Blessing, Berglen (DE); Gerhard Koenig, Lauterstein (DE); Christian Krueger, Stuttgart (DE); Ruediger Preiss, Winnenden (DE); Alois Raab, Boebingen (DE); Martin Schnabel, Aalen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/508,558

(22) PCT Filed: Mar. 8, 2003

(86) PCT No.: PCT/EP03/02392

§ 371 (c)(1),
(2), (4) Date: May 24, 2005

(87) PCT Pub. No.: WO03/081018

PCT Pub. Date: Oct. 2, 2003

(65) Prior Publication Data

US 2005/0205052 A1   Sep. 22, 2005

(30) Foreign Application Priority Data

Mar. 22, 2002  (DE) ................ 102 13 025

(51) Int. Cl.
*F02B 3/00*    (2006.01)
(52) U.S. Cl. ...................... 123/299; 123/504
(58) Field of Classification Search ............ 123/299, 123/300, 304, 305, 430, 500–505
See application file for complete search history.

(56) References Cited

U.S. PATENT DOCUMENTS

| 6,505,601 B1 * | 1/2003 | Jorach et al. | 123/295 |
| 6,513,487 B1 * | 2/2003 | Jorach et al. | 123/299 |
| 6,516,773 B1 * | 2/2003 | Dutart et al. | 123/299 |

(Continued)

FOREIGN PATENT DOCUMENTS

DE   196 36 088   3/1998

(Continued)

OTHER PUBLICATIONS

Van Basshuysen/Schaefer: "Hanbuch Verbrennungsmotor, 2 Auflage" Jun. 2002, Vieweg&Sohn, Braunschweig/Wiesbaden XP 002244763 Seite 432, Absatz 12.5, Seite 435, Absatz 3; Abbildungen 12-22, 12-24.

*Primary Examiner*—Mahmoud Gimie
(74) *Attorney, Agent, or Firm*—Crowell & Moring LLP

(57) ABSTRACT

A method is provided for operating an internal combustion piston engine, in which fuel is injected directly into a working chamber in the form of a pre-injection and main injection by means of an injection nozzle with a plurality of injection holes. The pre-injection takes place in a clocked manner. In order to minimize the moistening of the walls of the combustion chamber, a higher fuel pressure prevails in an injection device during the main injection than during the pre-injection. Furthermore, optimum homogenization of the pre-injected quantity of fuel is obtained by restricting the range of the injected fuel jets while simultaneously maximizing the atomization of the fuel particles and reinforcing the disintegration of the fuel jets during the clocked pre-injection.

42 Claims, 3 Drawing Sheets

U.S. PATENT DOCUMENTS

| | | | |
|---|---|---|---|
| 6,536,209 B1* | 3/2003 | Fluga et al. | 60/284 |
| 6,644,269 B1* | 11/2003 | Kato et al. | 123/305 |
| 6,796,290 B1* | 9/2004 | Boehland et al. | 123/446 |
| 6,808,124 B1* | 10/2004 | Egler | 239/88 |
| 6,948,476 B1* | 9/2005 | Gioannini et al. | 123/299 |
| 2003/0019466 A1* | 1/2003 | Walter et al. | 123/299 |
| 2003/0172902 A1* | 9/2003 | Gatellier et al. | 123/298 |

FOREIGN PATENT DOCUMENTS

| | | |
|---|---|---|
| DE | 196 39 172 | 4/1998 |
| DE | 199 53 932 | 5/2001 |
| EP | 0 786 592 | 7/1997 |
| EP | 1 132 607 | 9/2001 |
| WO | WO 02/079623 | 3/2002 |

* cited by examiner

SELF-IGNITING INTERNAL COMBUSTION ENGINE

BACKGROUND AND SUMMARY INVENTION

The invention relates to a method for operating an internal combustion piston engine, in particular a diesel internal combustion engine in which fuel is injected directly into a combustion chamber in a plurality of fuel jets of a certain range by means of an injection nozzle comprising a nozzle needle and injection holes, some of the fuel from an injection cycle being injected in partial quantities during a compression cycle as a clocked pre-injection, and remaining fuel being injected at a later time as a main injection into the combustion chamber at a higher injection pressure than during the pre-injection. The invention also relates to an injection nozzle for carrying out this method.

This application is related to application Ser. No. 10/508,570 filed on even date herewith and based on PCT/EP03/02393.

In the modern internal combustion engines having self-ignition, the fuel is injected directly into a combustion chamber. In the case of a combustion of this type, there inevitably arise due to the heterogeneous manner in which the combustion is conducted local zones in which there is a virtually stoichiometric fuel/air mixture. High combustion temperatures are produced in these zones, resulting in a high thermal NO formation. On the other hand, further zones which are rich in fuel and in which soot is formed arise. Given good turbulent mixing and an excess of air, some of the soot which is formed is re-oxidized, with complete burning off of the soot not being achieved.

DE 19953932 A1 (corresponding U.S. Pat. No. 6,505,601), discloses a method in which a combined homogeneous/heterogeneous method of operation for obtaining average and relatively high loads is proposed. In this method, the intention is for one injection strategy to be used both to permit an early homogeneous mixture formation in the compression stroke and also a subsequent heterogeneous mixture formation around the upper dead-center position, with the fuel injection in the case of the homogeneous mixture formation taking place at a lower injection pressure than in the case of the heterogeneous mixture formation in order to avoid fuel from being deposited onto the cold walls of the combustion chamber.

It has nevertheless been shown that, despite the above-proposed measure, portions of the fuel pass onto the walls of the combustion chamber and, for the most part, do not participate in the homogeneous combustion, and lead to increased HC and CO emissions. Therefore, further measures have to be taken to prevent any further moistening of the wall of the combustion chamber with fuel.

The invention is based on the object of providing a method for an internal combustion engine having self-ignition, with which a depositing of fuel on the walls of the combustion chamber is avoided. This is achieved according to the invention by a method of the abovementioned type, wherein the pre-injection is clocked in such a manner that, for each partial quantity, a range of the fuel jet in the combustion chamber is restricted to be somewhat smaller than a distance to a boundary of the combustion chamber, whereby a disintegration of the injected fuel jets is reinforced at the same time. Furthermore, it is the aim of the invention to provide a device with which a self-igniting internal combustion engine is improved in respect of the exhaust behavior and the consumption. This is achieved according to the invention by providing an injection nozzle which has an inwardly opening nozzle needle and à plurality of injection holes, wherein a spray angle of 90° to 160° is set between the injected fuel jets, and the stroke of the nozzle needle can be adjusted in an opening direction.

Further refinements emerge from the subclaims.

According to the method according to the invention, the fuel is injected directly into a combustion chamber by means of an injection device which comprises an injection nozzle having a plurality of injection holes and a nozzle needle. Some of the fuel of the particular cycle is present in a compression stroke of the internal combustion engine as a clocked pre-injection in a plurality of partial quantities in the form of fuel jets having a certain range, the remaining fuel being injected as a main injection at a later time. According to the invention, the fuel is optionally injected during the main injection into the combustion chamber at a higher pressure than during the pre-injection.

According to the invention, the pre-injection is clocked in such a manner that, for each injected partial quantity, the range of the fuel jet in the combustion chamber is restricted. The range is somewhat smaller than the distance to a boundary of the combustion chamber, with a disintegration of the injected fuel jets in the combustion chamber being reinforced. The individual injection cycles are configured during the pre-injection in such a manner that the jet pulses are matched in each case to the individual injections, and, given the density of the gas in the combustion chamber at a particular instance, the range of the fuel jets is approximately the distance as far as the cylinder wall on the combustion-chamber side, or the piston head. A depositing of fuel on the wall is therefore avoided. The injection jet pulse and the partial injection quantity are controlled by the duration of the pulse in combination with specific use of the throttling of the inflowing fuel in the seat of the nozzle needle, with the result that the injected fuel jets disintegrate because of reinforced atomization. As a result, the best possible mixture homogenization of the injected partial quantities takes place, with a significant depositing of fuel onto the cylinder wall being avoided at the same time.

The higher pressure means that, for the heterogeneous portion of combustion, the criteria for an effective, conventional injection are fulfilled, since what is important here is a high jet pulse, intensive jet/wall interaction, and as good as possible utilization of air and turbulent mixing.

According to one embodiment of the invention, a stroke of the nozzle needle of the injection nozzle varies during the clocked pre-injection. This permits a specific injection of fuel during the clocked pre-injection, as a result of which the operating range with purely homogeneous combustion can be further expanded. Furthermore, the variation of the needle stroke permits a high degree of homogenization, since the accumulation of fuel particles on the walls of the combustion chamber is minimized. As a result, the knocking tendency can be reduced to a certain degree.

According to the invention, the pressure of the injected fuel can be varied during the clocked pre-injection. In this case, the injection pressure is preferably raised in order to counteract the rising pressure in the combustion chamber during the compression. This enables, for example, the depth of penetration of the injection jets in the combustion chamber to be kept constant during the clocked pre-injection.

According to a further variant of the invention, a cycle duration during the pre-injection is varied in such a manner that the partial quantities of fuel of the pre-injection differ. In this case, the variation can be designed in such a manner that the partial quantity of fuel injected later is larger than the previous partial quantity of fuel. Furthermore, according to the invention the last partial quantity of fuel of the pre-injection can be reduced in relation to the largest partial quantity of fuel that has previously occurred in the pre-injection in order to oppose a severe enrichment of the mixture cloud which has already been homogenized in advance.

For greater atomization of the fuel, according to the invention the stroke of the nozzle needle of the injection nozzle is varied, so that an unstable, cavitating flow is produced in the injection holes of the injection nozzle. As a result, an expansion of the injection jets and therefore a better distribution of the fuel can be achieved.

For the specific setting of a desired throttling action in the seat of the nozzle needle and an unstable, cavitating flow, a suitable structural measure, for example a double spring holder on the injection valve or a piezostrictive or magnetostrictive activation, can be used to assist in keeping the nozzle needle in a stroke position lying between the completely closed and completely open position. In this case, the effective flow cross section in the needle seat, i.e. between the nozzle needle and the needle seat, should be approximately 0.4 to 1.5 times the effective flow cross section of the sum of the injection holes.

By means of the mixture formation, obtained during the compression stroke, of the pre-injected quantity of fuel, with a high excess of air during the combustion, a significant thermal NO formation, and also formation of soot, are avoided, since the fuel is distributed finely and over a large area over the entire combustion chamber. For the main injection, which is matched thereto and takes place at a later time, the thermal NO formation for the heterogeneous phase of combustion is significantly reduced, because the concentration of oxygen is already significantly reduced by the preceding, homogeneous portion of combustion. An intensive, turbulent charging movement is preferably induced by the injection, this movement being assisted by the high injection pressure.

An optimum homogenization of the pre-injected portions of fuel in the compression stroke is achieved by the clocked pre-injection, with the result that the fuel jets first of all injected in the combustion chamber evaporate, and then mix with air before the next jets follow. Since, with the increase in compression, the pressure in the combustion chamber likewise increases, more fuel is added during the following clocking action.

In this case, the partial quantities occurring later in the form of fuel jets are impeded by the increased pressure in the combustion chamber from passing onto the wall of the combustion chamber or boundary of the combustion chamber. An increase in the injected quantity of fuel in the following partial quantity is therefore made possible during the clocking action, which is brought about by means of an increase in pressure in the fuel injection pressure or by an extension of the needle stroke.

An expanded cycle duration also gives rise to an increase in the quantity of fuel inserted. The simultaneous combination of two or even three of the abovementioned measures would also be conceivable.

A decrease in the partial injection quantity during the last clocking action may be advantageous in order to prevent a premature ignition of the homogenized mixture before the main injection occurs. Furthermore, the reduction of the last partial quantity during the clocked pre-injection can avoid over-enriching the mixture cloud which has been homogenized in advance.

In order to increase the rate of homogenization during the pre-injection, a swirling movement is produced in the combustion chamber, for example by means of a swirl inlet duct. It is the aim here to offset or laterally displace or move a fuel cloud of an injected fuel jet, which cloud is produced during an injection cycle, in such a manner that, during a following injection cycle, the newly injected fuel jet does not penetrate the fuel cloud of the preceding fuel jet.

According to one particularly advantageous embodiment, the pre-injection for the homogeneous portion of combustion takes place with clocking occurring two to seven times in a combustion stroke range of approx. 150° CA to 30° CA before the upper dead-center position. The number of clocking actions and also the injection time of the first partial quantity can be varied as a function of the load.

By contrast, the main injection is carried out, for the heterogeneous portion of combustion, in a range around the upper dead-center position either as a block injection or with a different injection profile, with the result that the flow of injected quantity of fuel is varied within the length of duration of the main injection in order to obtain a high pulse for the injection jets. A main injection with differing flow can be obtained by means of pressure modulation and/or by varying the stroke of the nozzle needle. In order to satisfy the requirements for an effective and heterogeneous combustion, the injection pressure is preferably raised to a maximum level, for example between 1800 and 2400 bar, for example by an injection device capable of pressure modulation. As appropriate, a short after-injection can follow directly after the closing of the nozzle needle during the block injection in order to obtain a further reduction in soot. It is conceivable for both the pre-injection and also the main injection to take place with the same fuel pressure. For example, in a common rail system, a pressure level of between 1000 and 1400 bar can prevail.

The after-injection is alternatively part of the main injection. In order to obtain optimum combustion, the main injection and, if appropriate, the after-injection take place successively as a function of the load around the upper dead-center position in a range of 10° CA before the upper dead-center position to 40° CA after the upper dead-center position, with an opening duration of the nozzle needle during the after-injection being set to be smaller than the opening duration of the needle of the main injection. It is also possible optionally for a late after-injection to take place which again does not participate in the combustion, and can serve only to regenerate an exhaust after treatment system connected downstream.

An injection strategy is proposed in the method according to the invention making it possible to use an advantageous propagation of the fuel jet and mixture formation in a specific manner. Both homogeneous and heterogeneous combined combustion are obtained. In this case, a multi-hole-type nozzle is used. The injection pressure is preferably adapted by means of a suitable injection system capable of pressure modulation. In this case, a needle-stroke-controlled injection system with pressure modulation can be used.

Further criteria for designing an additional after-injection may arise from the requirements of a possible exhaust aftertreatment measure.

In order to carry out the method according to the invention, an inwardly opening nozzle needle having a plurality of injection holes is proposed, in which the fuel is injected into the combustion chamber through the injection holes in the form of fuel jets, with the result that an injection angle of 90° to 160° can be set between the injected fuel jets.

According to the invention, the stroke of the nozzle needle can be adjusted in an opening direction, with the result that the stroke of the nozzle needle can be set in a variable manner during the clocked pre-injection. The stroke can alternatively be set as a function of the load. As a result, the injection quantity used during the clocked pre-injection is varied. Furthermore, the adjustment of the stroke causes an unstable, cavitating flow to be produced in the injection holes of the injection nozzle.

At least one injection nozzle which is arranged approximately centrally in the cylinder head of the internal combustion engine is proposed for the injection of the fuel. This may in principle be a conventional and therefore financially favorable hole-type nozzle of the seat-hole type, mini blind-hole type or blind-hole type.

According to one preferred embodiment of the invention, the injection nozzle has six to fourteen injection holes which are distributed over the circumference in one or two rows of holes. The distribution can take place uniformly. The injection holes are inclined in each case by an angle of 45° to 80° with respect to the nozzle axis. The spray cone angle is approx. 90° to 160°.

Further advantages emerge from the following description of the drawing. Exemplary embodiments of the invention are illustrated in the drawing. The description and the claims contain numerous features in combination. The expert will expediently also consider the features individually and combine them into meaningful further combinations. In the drawing:

DETAILED DESCRIPTION OF THE DRAWINGS

Figure 1:
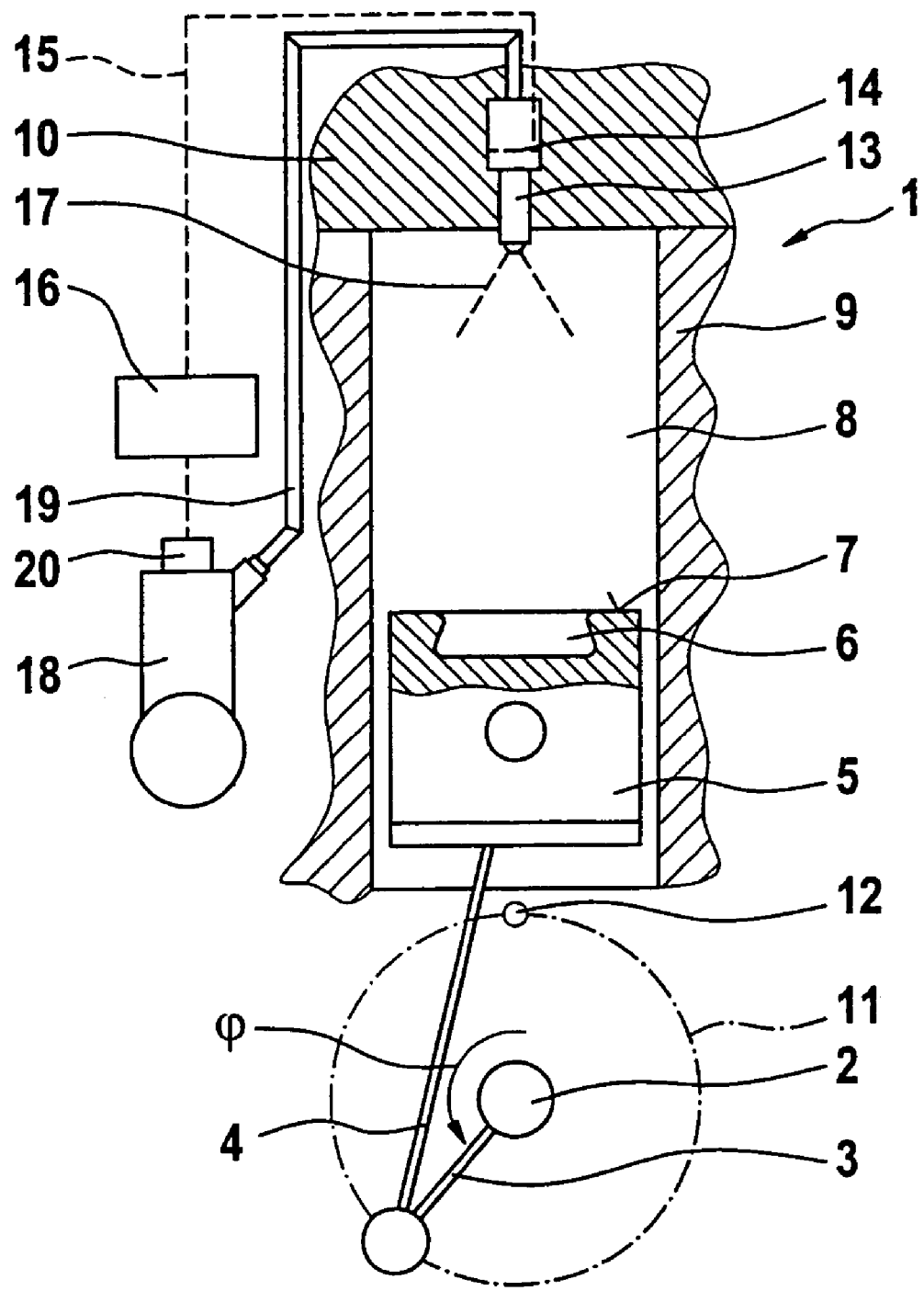
FIG. 1 shows a schematic cross section through an internal combustion piston engine.

FIG. 1 shows an internal combustion piston engine 1, in which a crankshaft 2 is driven via a connecting rod 4 by a piston 5 guided in a cylinder 9. A combustion chamber 8 which comprises a piston recess 6 let into the piston head 7 is formed in the cylinder 9 between the piston 5 and a cylinder head 10.

When a crank 3 of the crankshaft 2 is rotated in a crank circle 11 in the clockwise direction, the combustion chamber 8 is reduced, with the air enclosed in it being compressed. The charge cycle in the combustion chamber 8 takes place via gas exchange valves and gas ducts (neither illustrated) in the cylinder head 10.

With the crank 3 reaching an upper dead-center position 12, referred to as UDC below, the end of the compression is reached, in which the combustion chamber 8 assumes its smallest volume and the maximum compression pressure and the maximum compression temperature are reached. The current position of the piston 5 with respect to the cylinder head 10 is determined by the crank angle $\phi$ in relation to the upper dead-center position 12.

A multi-hole-type injection nozzle 13 is arranged centrally in the cylinder head 10. The injection nozzle 13 is activated by an electronic control unit 16, the engine controller, via a signal line 15 and an actuator 14, for example a piezoactuator. The injection jets emerging from the injection nozzle are denoted by 17.

The fuel is made available by an injection pump 18 in a plurality of pressure stages, a cut-off valve 20, expediently an electronically activatable solenoid valve, restricting the respective maximum pressure in the fuel line 19.

Figure 2:
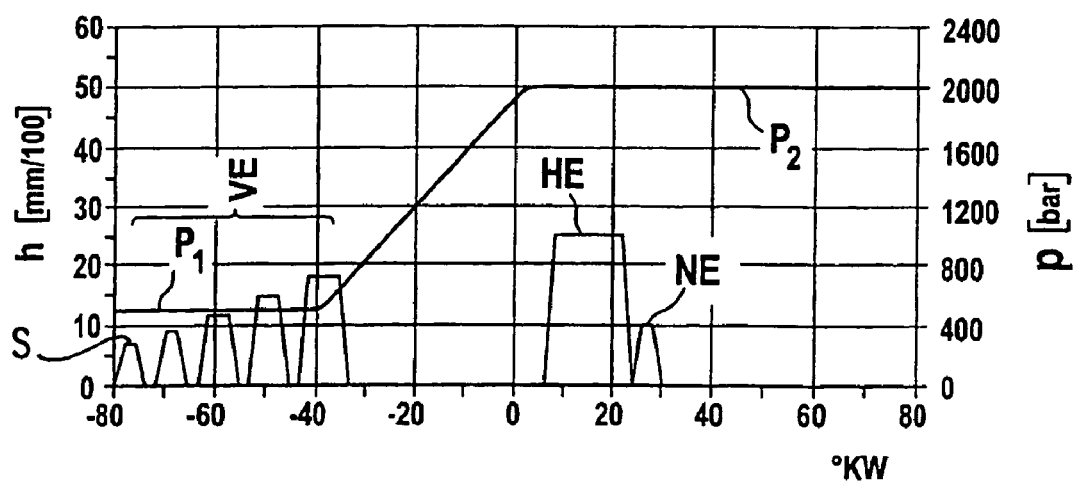
FIG. 2 shows a diagram of a fuel injection profile with pre-injection clocked 5 times and increasing cycle duration and increasing needle stroke at a constant injection pressure, and also a main injection with after-injection at an increased injection pressure.

A first embodiment of a fuel injection strategy for the internal combustion piston engine 1 is illustrated in FIG. 2. The diagram shows a fuel injection profile for a combined homogeneous/heterogeneous operation with pre-injection PI clocked 5 times and increasing cycle duration at a constant injection pressure $P_1$ which is 500 bar, for example. Furthermore, FIG. 2 shows a main injection MI and an after-injection AI at an increased injection pressure $P_2$, with a maximum needle stroke s being set during the main injection MI.

According to the injection strategy illustrated in FIG. 2, first of all at an injection pressure $P_1$ a clocked pre-injection PI takes place in the compression stroke of the internal combustion piston engine 1 in a crank angle range of 80° CA to approximately 35° CA before UDC. The clocked pre-injection PI takes place in such a manner that, during each clocking action, a different needle stroke s is set. The specific clocking of the pre-injection PI results in a homogenization of the injected partial quantities. An increasing setting of the needle stroke is preferred. The main injection and after-injection take place one after the other at a higher injection pressure $P_2$ in a region between UDC and approximately 30° CA after UDC. During the main injection MI, a higher needle stroke s is set than in the pre-injection PI, with the duration of opening of the needle during the after-injection AI being set to be smaller than the duration of opening of the needle in the main injection MI.

Figure 3:
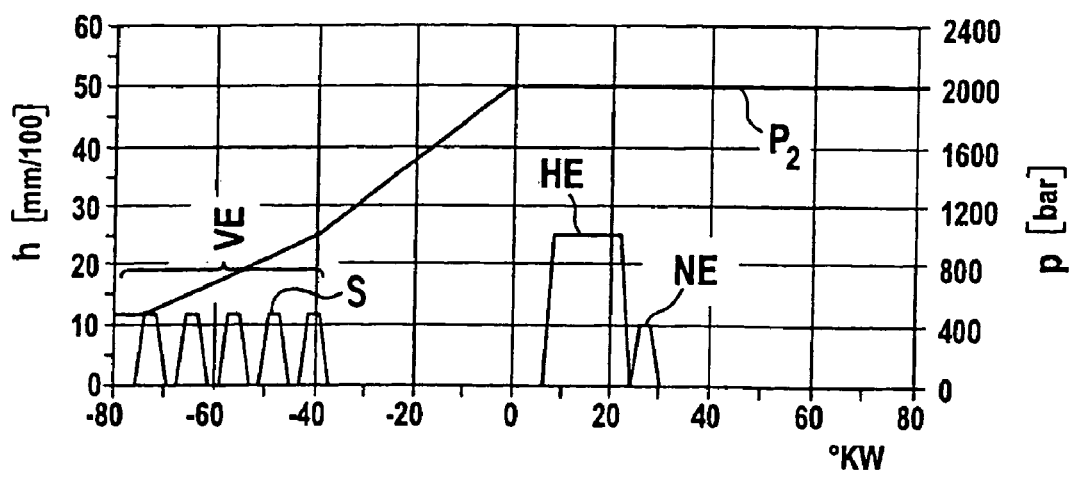
FIG. 3 shows a diagram of a fuel injection profile with pre-injection clocked 5 times and with the cycle duration remaining the same, at a constant needle stroke and increasing injection pressure during the pre-injection, and also a main injection with after-injection at an increased injection pressure.

FIG. 3 is an illustration of a diagram in which an alternative injection strategy for the internal combustion piston engine 1 is shown. It illustrates the fuel injection profile with which a combined homogeneous/heterogeneous operation is obtained with the pre-injection PI clocked 5 times for homogenization with the cycle duration remaining the same and with increasing injection pressure during the pre-injection PI, and with a main injection MI with an increased injection pressure $P_2$ with the needle stroke s set to the maximum and an after-injection AI.

The clocked pre-injection PI according to FIG. 3 takes place in the compression stroke in a crank angle range of approximately 80° CA to approximately 35° CA before UDC. It takes place in such a manner that, during each clocking action, the injection pressure increases, i.e. during the pre-injection PI a lower pressure prevails in a fuel line, for example in a common rail injection system, the line with the early injection, than in the following injection, with the needle stroke s remaining constant during the clocked pre-injection PI. The main injection and after-injection take place successively at a higher injection pressure $P_2$ in a range between the upper dead-center position and approximately 30° CA after UDC. During the main injection MI, a higher needle stroke s is set than during the pre-injection PI, with the duration of opening of the needle during the after-injection AI being set to be smaller than the duration of opening of the needle in the main injection MI.

Figure 4:
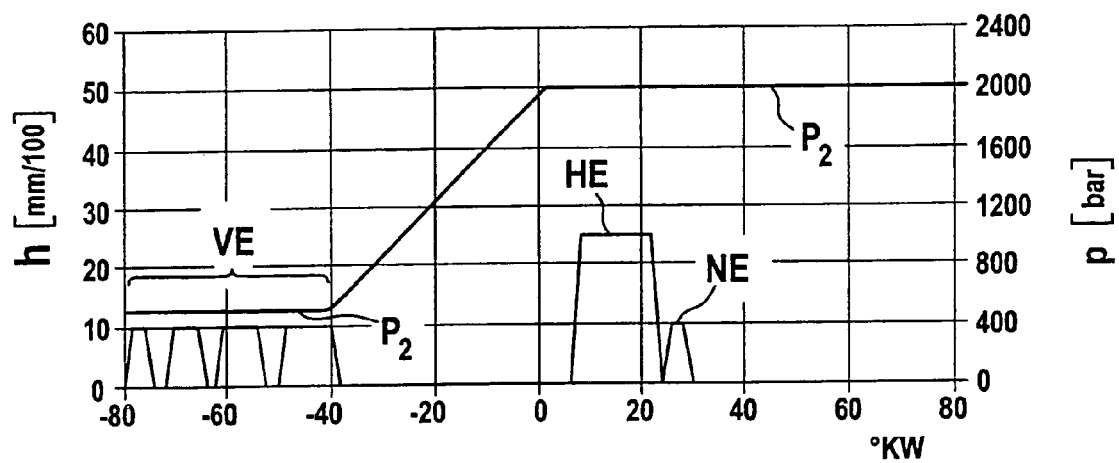
FIG. 4 shows a diagram of a fuel injection profile with pre-injection clocked 4 times and with increasing cycle duration at a constant injection pressure, and also a main injection with after-injection at an increased injection pressure.

One particularly advantageous injection strategy is provided by the injection profile according to FIG. 4. A combined homogeneous/heterogeneous operation with pre-injection clocked 4 times and with increasing cycle duration at a constant injection pressure is proposed therein, in which the nozzle needle 13a remains in a lower stroke position. Furthermore, a main injection MI at an increased injection pressure $P_2$ and a needle stroke s set to the maximum and also an after-injection AI is provided.

The clocked pre-injection PI takes place in the compression stroke in a crank angle range of 80° CA to approximately 35° CA before UDC. It is undertaken in such a manner that, during each clocking action, the injection pressure $P_1$ remains constant. The needle stroke s similarly remains constant during the clocked pre-injection PI. The main injection and after-injection take place successively at a higher injection pressure $P_2$ in a range between the upper dead-center position and approximately 35° CA after UDC. During the main injection MI, a higher needle stroke s is set than during the pre-injection PI, with the duration of opening of the needle during the after-injection AI being set to be smaller than the duration of opening of the needle in the main injection MI.

The low injection pressure $P_1$ in the abovementioned injection strategies according to FIGS. 2, 3 and 4 is selected in such a manner that the clocked pre-injection PI results in a homogeneous mixture formation, in which the injected fuel accumulates to an insignificant extent on the boundary of the combustion chamber 8.

In the above-described injection strategies, the main injection MI of the fuel in the region of the upper dead-center position serves for a heterogeneous mixture formation and permits an increase in the load beyond the load which can be obtained by the homogeneous portion. At the time of the main injection MI, a cool-flame combustion of the homogeneous portion is shut off and a hot-flame combustion takes place. The main injection is designed in such a manner that a temperature level obtained by the main combustion does not lie in the region of increased NOx formation (Zeldovich mechanism). The after-injection serves to reduce the soot particles produced, since a decrease in the main injection quantity by the after-injection quantity makes it possible to prevent the formation of fuel-rich zones.

Figure 5:
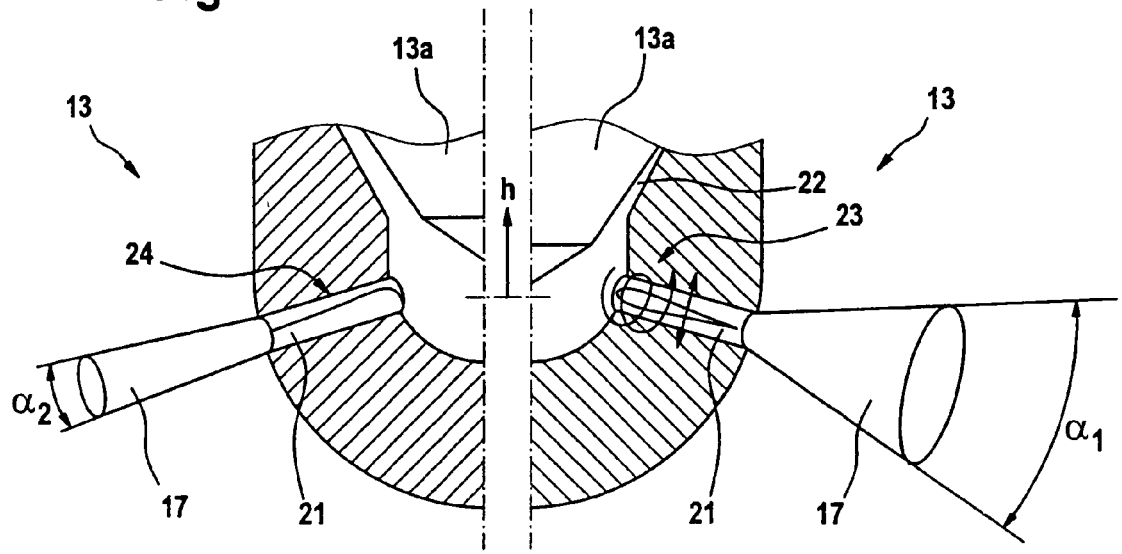
FIG. 5 shows a schematic illustration of the effect of an unstable, cavitating flow in the nozzle hole of a multi-hole-type nozzle.

FIG. 5 is a schematic illustration of the injection nozzle 13 of the blind-hole-type nozzle type, where a nozzle of the seat-hole-type nozzle type would be just as suitable. In the injection nozzle 13 according to FIG. 5, the effect of an unstable, cavitating flow caused in a nozzle hole 21 of the injection nozzle 13 with a small needle stroke s of the nozzle needle 13a, i.e. with the injection nozzle 13 partially open, and the resultant action on the angle of propagation of the injection jet 17 are illustrated.

On the right-hand side in FIG. 5, the injection nozzle 13 is only partially open, as a result of which a throttling in the nozzle needle seat 22 is obtained. This throttling causes an unstable, cavitating flow in the nozzle hole 21 which leads to the angle of propagation $\alpha_1$ of the fuel jet 17. In comparison to an injection nozzle with maximum stroke setting, as is illustrated on the left-hand side of FIG. 5, the angle of propagation $\alpha_1$ due to the unstable, cavitating flow is greater than an angle of propagation $\alpha_2$ which is brought about without such a flow. The unstable, cavitating flow causes sharp fluctuations in the inside flow 23 in the nozzle, these fluctuations leading, when fuel emerges from the nozzle hole 21, to a reinforced disintegration of the fuel jet and therefore to a large angle of propagation $\alpha_1$.

The fuel jet with the angle of propagation $\alpha_1$ propagates in the combustion chamber with intensive atomization, and therefore brings about better homogenization and a rapid evaporation of fuel, with the result that more fuel can be injected in a partial quantity of the pre-injection PI without a significant moistening of the wall of the combustion chamber.

By contrast, in the case of the injection nozzle 13 having the maximum stroke setting according to the left-hand side in FIG. 5, a stable, cavitating flow is formed. In the interior of the nozzle hole 21 on the left-hand side, this flow causes a two-phase flow 24 which leads to a normal disintegration of the fuel. In comparison to a partially open injection nozzle, the angle of propagation $\alpha_2$ caused by the stable, cavitating flow is smaller than the angle of propagation $\alpha_1$.

The invention is based on a method for operating an internal combustion piston engine, in which fuel is injected directly into a combustion chamber as a pre-injection and main injection by means of an injection nozzle having a plurality of injection holes, the pre-injection taking place in a clocked manner. In order to minimize the moistening of the walls of the combustion chamber and especially a cylinder barrel, it is proposed that a higher fuel pressure optionally prevails in an injection device during the main injection than during the pre-injection. Furthermore, an optimum homogenization of the pre-injected fuel quantity is obtained by restricting the range of the injected fuel jets while simultaneously maximizing the atomization of the fuel particles and reinforcing the disintegration of the fuel jets during the clocked pre-injection.

The invention claimed is:

1. A method for operating a self-igniting internal combustion piston engine, in which fuel is injected directly into a combustion chamber in a plurality of fuel jets of a certain range by means of an injection nozzle comprising a nozzle needle and injection holes, some of the fuel from an injection cycle being injected in partial quantities during a compression cycle as a clocked pre-injection, and remaining fuel being injected at a later time as a main injection into the combustion chamber at a higher injection pressure than during the pre-injection, wherein the pre-injection is clocked in such a manner that, for each partial quantity, a range of the fuel jet in the combustion chamber is restricted to be somewhat smaller than a distance to a boundary of the combustion chamber, whereby a disintegration of the injected fuel jets is reinforced at the same time.

2. The method as claimed in claim 1, wherein a stroke of the nozzle needle of the injection nozzle is varied during the clocked pre-injection.

3. The method as claimed in claim 1, wherein pressure of the injected fuel is raised during the clocked pre-injection.

4. The method as claimed in claim 2, wherein pressure of the injected fuel is raised during the clocked pre-injection.

5. The method as claimed in claim 1, wherein a cycle duration for the clocked pre-injection is varied for different sequential clocked pre-injections, so that partial quantities of fuel of the pre-injection differ for the respective different clocked pre-injections.

6. The method as claimed in claim 5, wherein the cycle duration of the different clocked pre-injections is varied so that a partial quantity of fuel injected later is larger than a previous partial quantity of fuel.

7. The method as claimed in claim 5, wherein the last partial quantity of fuel of the last clocked pre-injection is reduced in relation to the largest partial quantity of fuel that has previously occurred in the clocked pre-injections.

8. The method as claimed in claim 6, wherein the last partial quantity of fuel of the last clocked pre-injection is reduced in relation to the largest partial quantity of fuel that has previously occurred in the clocked pre-injections.

9. The method as claimed in claim 1, wherein a stroke of the nozzle needle of the injection nozzle is varied in such a manner that an unstable, cavitating flow is produced in the injection holes of the injection nozzle, as a result of which an increased atomization of the fuel in the combustion chamber is obtained.

10. The method as claimed in claim 5, wherein a stroke of the nozzle needle of the injection nozzle is varied in such a manner that an unstable, cavitating flow is produced in the injection holes of the injection nozzle, as a result of which an increased atomization of the fuel in the combustion chamber is obtained.

11. The method as claimed in claim 1, wherein a stroke of the nozzle needle of the injection nozzle is varied in such a manner that within the injection nozzle an effective flow cross section between the nozzle needle and a nozzle needle seat is approximately 0.4 to 1.5 times an effective flow cross section of the sum of all of the injection holes.

12. The method as claimed in claim 9, wherein a stroke of the nozzle needle of the injection nozzle is varied in such a manner that within the injection nozzle an effective flow cross section between the nozzle needle and a nozzle needle seat is approximately 0.4 to 1.5 times an effective flow cross section of the sum of all of the injection holes.

13. The method as claimed in claim 1, wherein a fuel cloud of a fuel jet, which cloud is produced during an injection cycle, is offset or displaced laterally during the pre-injection by means of a swirling movement formed in the combustion chamber, so that, during a following injection cycle, the Previously Presentedly injected fuel jets do not penetrate the fuel cloud of the preceding injection cycle.

14. The method as claimed in claim 9, wherein a fuel cloud of a fuel jet, which cloud is produced during an injection cycle, is offset or displaced laterally during the pre-injection by means of a swirling movement formed in the combustion chamber, so that, during a following injection cycle, the Previously Presentedly injected fuel jets do not penetrate the fuel cloud of the preceding injection cycle.

15. The method as claimed in claim 11, wherein a fuel cloud of a fuel jet, which cloud is produced during an injection cycle, is offset or displaced laterally during the pre-injection by means of a swirling movement formed in the combustion chamber, so that, during a following injection cycle, the Previously Presentedly injected fuel jets do not penetrate the fuel cloud of the preceding injection cycle.

16. The method as claimed in claim 1, wherein the pre-injection takes place with clocking occurring two to seven times in a compression stroke range of approx. 150° CA to 30° CA before the upper dead-center position.

17. The method as claimed in claim 5, wherein the pre-injection takes place with clocking occurring two to seven times in a compression stroke range of approx. 150° CA to 30° CA before the upper dead-center position.

18. The method as claimed in claim 9, wherein the pre-injection takes place with clocking occurring two to seven times in a compression stroke range of approx. 150° CA to 30° CA before the upper dead-center position.

19. The method as claimed in claim 11, wherein the pre-injection takes place with clocking occurring two to seven times in a compression stroke range of approx. 150° CA to 30° CA before the upper dead-center position.

20. The method as claimed in claim 13, wherein the pre-injection takes place with clocking occurring two to seven times in a compression stroke range of approx. 150° CA to 30° CA before the upper dead-center position.

21. The method as claimed in claim 1, wherein alternatively part of the main injection takes place as an after-injection, and as appropriate, the after-injection take place successively around the upper dead-center position in a range of 10° CA before the upper dead-center position to 40° CA after the upper dead-center position.

22. The method as claimed in claim 2, wherein alternatively part of the main injection takes place as an after-injection, and as appropriate, the after-injection take place successively around the upper dead-center position in a range of 10° CA before the upper dead-center position to 40° CA after the upper dead-center position.

23. The method as claimed in claim 5, wherein alternatively part of the main injection takes place as an after-injection, and as appropriate, the after-injection take place successively around the upper dead-center position in a range of 10° CA before the upper dead-center position to 40° CA after the upper dead-center position.

24. The method as claimed in claim 9, wherein alternatively part of the main injection takes place as an after-injection, and as appropriate, the after-injection take place successively around the upper dead-center position in a range of 10° CA before the upper dead-center position to 40° CA after the upper dead-center position.

25. The method as claimed in claim 11, wherein alternatively part of the main injection takes place as an after-injection, and as appropriate, the after-injection take place successively around the upper dead-center position in a range of 10° CA before the upper dead-center position to 40° CA after the upper dead-center position.

26. The method as claimed in claim 13, wherein alternatively part of the main injection takes place as an after-injection, and as appropriate, the after-injection take place successively around the upper dead-center position in a range of 10° CA before the upper dead-center position to 40° CA after the upper dead-center position.

27. The method as claimed in claim 16, wherein alternatively part of the main injection takes place as an after-injection, and as appropriate, the after-injection take place successively around the upper dead-center position in a range of 10° CA before the upper dead-center position to 40° CA after the upper dead-center position.

28. An injection nozzle for carrying out the method as claimed in claim 1, which has an inwardly opening nozzle needle and a plurality of injection holes,
wherein a spray angle of 90° to 160° is set between the injected fuel jets, and the stroke of the nozzle needle can be adjusted in an opening direction.

29. An injection nozzle for carrying out the method as claimed in claim 5, which has an inwardly opening nozzle needle and a plurality of injection holes,
wherein a spray angle of 90° to 160° is set between the injected fuel jets, and the stroke of the nozzle needle can be adjusted in an opening direction.

30. The injection nozzle as claimed in claim 28, wherein the stroke of the nozzle needle of the injection nozzle is set in such a manner that within the injection nozzle an effective flow cross section between the nozzle needle and the needle seat is approximately 0.4 to 1.5 times an effective flow cross section of the sum of all the injection holes.

31. The injection nozzle as claimed in claim 28, wherein the stroke of the nozzle needle is set by means of a double spring securing means.

32. The injection nozzle as claimed in claim 30, wherein the stroke of the nozzle needle is set by means of a double spring securing means.

33. A method of operating a self igniting internal combustion piston engine, comprising:
   injecting fuel directly into an engine combustion chamber in a plurality of fuel jets of a certain range utilizing an injection nozzle having a nozzle needle and injection holes, said injecting including a plurality of sequential clocked pre-injections at respective pre-injection pressures followed by a main injection at a higher injection pressure than the pre-injection pressures,
   wherein the clocked pre-injections are controlled so that the injected fuel jets have a range smaller than a distance to a boundary of the combustion chamber.

34. A method according to claim 33, comprising:
   further reinforcing of disintegration of the injected fuel jets during said pre-injections.

35. A method according to claim 34, wherein said further reinforcing of disintegration of the injected fuel jets includes varying a stroke of the nozzle needle during the clocked pre-injections.

36. A method according to claim 33, wherein a cycle duration for the clocked pre-injection is varied for different sequential clocked pre-injections, so that partial quantities of fuel of the pre-injection differ for the respective different clocked pre-injections.

37. A method according to claim 36, wherein the cycle duration of the different clocked pre-injections is varied so that a partial quantity of fuel injected later is larger than a previous partial quantity of fuel.

38. A method according to claim 36, wherein the last partial quantity of fuel of the last clocked pre-injection is reduced in relation to the largest partial quantity of fuel that has previously occurred in the clocked pre-injections.

39. A method according to claim 33, wherein the pre-injection takes place with clocking occurring two to seven times in a compression stroke range of approx. 150° CA to 30° CA before the upper dead-center position.

40. Self-igniting internal combustion piston engine apparatus, comprising:
   fuel injecting means for injecting fuel directly into an engine combustion chamber in a plurality of fuel jets of a certain range utilizing an injection nozzle having a nozzle needle and injection holes, said injecting including a plurality of sequential clocked pre-injections at respective pre-injection pressures followed by a main injection at a higher injection pressure than the pre-injection pressures, and
   control means for controlling the clocked pre-injection jets to have a range smaller than a distance to a boundary of the combustion chamber.

41. Apparatus according to claim 40, comprising further fuel disintegration means for reinforcing disintegration of injected fuel jets during said pre-injection.

42. Apparatus according to claim 41, wherein said further fuel disintegration means includes stroke varying means for varying stroke of the nozzle needle during the clocked pre-injections.

* * * * *